(12) United States Patent
Drewes

(10) Patent No.: US 9,903,431 B2
(45) Date of Patent: Feb. 27, 2018

(54) OPERATING APPARATUS FOR A BRAKE

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/910,540

(22) PCT Filed: Aug. 1, 2014

(86) PCT No.: PCT/EP2014/066612
§ 371 (c)(1),
(2) Date: Feb. 5, 2016

(87) PCT Pub. No.: WO2015/022205
PCT Pub. Date: Feb. 19, 2015

(65) Prior Publication Data
US 2016/0186826 A1      Jun. 30, 2016

(30) Foreign Application Priority Data

Aug. 12, 2013   (DE) .................. 10 2013 215 850

(51) Int. Cl.
*F16D 65/28*      (2006.01)
*F16D 125/68*    (2012.01)
(Continued)

(52) U.S. Cl.
CPC ........ *F16D 65/28* (2013.01); *F16D 2023/126* (2013.01); *F16D 2121/14* (2013.01);
(Continued)

(58) Field of Classification Search
CPC ............... F16D 65/28; F16D 2023/126; F16D 2121/14; F16D 2125/66; F16D 2125/68
(Continued)

(56) References Cited

U.S. PATENT DOCUMENTS 4,356,897 A      11/1982   Urban
4,819,996 A  *   4/1989    Belart .................... B60T 8/38
                                                                 188/345

(Continued)

FOREIGN PATENT DOCUMENTS

AU        2014308091       2/2016
CN        1930404          3/2007
(Continued)

OTHER PUBLICATIONS

Bedienungs- und Instandhaltungsanweisung für die dreichachsige, dieselhydraulische 650 PS Rangierlokomotive der Serienbauart V 60. In: Deutsche Bundesbahn. DV 987 Teil 325. 1961 (Manual on installation and maintenance for thet hree-axle Diesel hydraulic 650 PS switching locomotive of the V60 type; German Federal Railway).

*Primary Examiner* — Thomas W Irvin
(74) *Attorney, Agent, or Firm* — Price Heneveld LLP

(57) ABSTRACT

The invention relates to an operating apparatus for a brake, having an actuator unit with a linearly mobile actuator element, an actuating unit with a linearly mobile actuating element by means of which a braking element can be moved relative to a brake disc or a brake drum, and a transmission unit for transmitting a force from the actuator element to the actuating element. The transmission unit has a deflection device by means of which the force which is transmitted from the actuator element to the actuating element can be deflected from a first direction into a second direction.

20 Claims, 2 Drawing Sheets

(51) Int. Cl.
*F16D 125/64* (2012.01)
*F16D 23/12* (2006.01)
*F16D 121/14* (2012.01)
*F16D 125/66* (2012.01)

(52) U.S. Cl.
CPC ...... *F16D 2125/64* (2013.01); *F16D 2125/66* (2013.01); *F16D 2125/68* (2013.01)

(58) Field of Classification Search
USPC ............. 188/343, 79.55, 72.9, 361, 362
See application file for complete search history.

(56) References Cited

U.S. PATENT DOCUMENTS

| | | | | |
|---|---|---|---|---|
| 5,289,682 | A * | 3/1994 | Gill | B60T 13/567 60/547.1 |
| 5,501,305 | A * | 3/1996 | Stalmeir | F16D 55/2245 188/153 R |
| 6,206,149 | B1 | 3/2001 | Heidenreich et al. | |
| 6,698,553 | B2 * | 3/2004 | Varela | F16D 65/18 188/72.6 |
| 9,010,502 | B2 * | 4/2015 | Roberts | F16C 11/0623 188/72.9 |
| 2009/0175677 | A1 * | 7/2009 | Roberts | F16C 11/0623 403/150 |
| 2016/0186826 | A1 | 6/2016 | Drewes | |

FOREIGN PATENT DOCUMENTS

| | | |
|---|---|---|
| CN | 101000076 | 7/2007 |
| CN | 102207144 | 10/2011 |
| DE | 4330440 | 9/1995 |
| DE | 102008064404 | 6/2009 |
| EP | 0070106 | 1/1983 |
| EP | 1118790 | 7/2001 |
| EP | 1348882 | 10/2003 |
| EP | 3001852 | 4/2016 |
| FR | 2197756 | 8/1973 |
| GB | 552174 | 3/1943 |
| GB | 1425351 | 9/1972 |
| WO | 2009050086 | 4/2009 |
| WO | 2015022205 | 2/2015 |

* cited by examiner

OPERATING APPARATUS FOR A BRAKE

BACKGROUND OF THE INVENTION

The invention relates to an operating apparatus for a brake, in particular a drum brake, in particular for a utility vehicle.

Drum brakes for utility vehicles are known in the prior art. They usually comprise an actuator unit, which may be formed by a pneumatically or hydraulically operated brake cylinder, an actuating unit for displacing a brake element, which is covered by a brake lining, as well as a transmission unit for transmitting a force from the actuator unit to the actuating unit.

In so-called wedge drum brakes, a brake lining carrier with a brake lining attached thereto is moved radially outwards and pushed against the inner surface of a rotating brake drum by means of a wedge-shaped longitudinally mobile actuating element. The axle formed by the wedge and the brake cylinder runs either parallel or transverse to the axle of the wheel to be braked, depending on the available space. The transmission element arranged between the brake cylinder and the actuating element may be dimensioned such that the brake cylinder is arranged in a favorable position, depending on the available building space.

Due to the dimensions of the brake cylinder, it is hardly or not at all possible to mount such an operating apparatus in the case of certain assemblies, which have a limited clearance only.

The object underlying the present invention is to provide an operating apparatus for a brake, which has a field of use, which is a large as possible, and which may in particular also be used in case the installation space is limited.

SUMMARY OF THE INVENTION

According to the invention, the operating apparatus, which may be provided in particular for operating a drum brake, comprises an actuator unit, in particular a brake cylinder, with a linearly mobile actuator element, an actuating unit with a linearly mobile actuating element, by means of which a braking element can be moved relative to a brake disc or a brake drum, and a transmission unit for transmitting a force from the actuator element or actuator unit to the actuating element or to the actuating unit. According to the invention, the transmission unit comprises a deflection device, by means of which the force, which is transmitted from the actuator element to the actuating element, or the force, which is transmitted from the actuator unit to the actuating unit, can be deflected from a first direction into a second direction. A basic idea of the invention may be seen in that the force transmitted between the actuator unit and the actuating unit is deflected along an angle so that the orientation of the actuator unit can be realized irrespective of the orientation of the actuating unit. This means in particular that a longitudinal axis of the actuator unit may be inclined or bent relative to a longitudinal axis of the actuating unit. In this way, in the case of a building space, which is limited in the axial direction, the brake cylinder may be displaced into an area which, relative to the wheel axle, is positioned radially further outside. The axle of the brake cylinder or of the actuator element runs at an angle or non-parallel to the axis of the spreader unit or of the actuating element. In order to transmit the braking force from the actuator unit to the actuating unit, a deflection element is provided, which, according to the invention, is arranged in the application path between the actuator unit and the actuating unit. Due to the deflection of the braking force or the movement of the actuator element, the operating apparatus of the invention may also be mounted in assemblies and suspension systems, such as swing axle assemblies, steering axles, independent wheel suspensions or portal axles, which are demanding when it comes to building space requirements. Due to the concrete selection of the angle of deflection and/or the direction of deflection, the actuator unit may be arranged in almost any position. The actuating unit may be formed in particular as a spreader unit and comprise a longitudinally mobile wedge as actuating element. The deflection may be done basically in any way. For example, it is conceivable to arrange between the actuator element and the actuating element a freely mobile coupling element, such as a coupling rod, along which the force is transmitted from the actuator element to the actuating element.

According to the invention, it is preferred that the deflection device has a deflection element, which is rotatably mounted about an in particular stationary axis of rotation and which comprises at least two coupling devices, which are displaced or offset relative to each other in the direction of rotation, for coupling respective force transmission elements. Due to the rotation element mounted on an axis of rotation the force may be reliably and precisely deflected, wherein there is a mechanical support on the axis of rotation of the deflection element. The transverse forces acting on the actuator element and on the actuating element may be reduced in this manner. The force transmission elements may be in particular the actuator element and the actuating element, wherein basically also a separate force transmission element may be interconnected. The coupling devices may be formed in particular as contact surfaces for the transmission of force.

In order to transmit the force into the deflection element, in particular a first coupling device or contact surface may be provided, onto which the actuator element or a force transmission element connected thereto acts. In order to transmit the force from the deflection element to the actuating element or a force transmission element connected thereto, in particular a second coupling device or contact surface may be provided.

Preferably, the coupling devices are displaced relative to each other in the circumferential direction at an angle of 20° to 120°, particularly preferably 75° to 105°. Within the context of the present invention, circumferential direction means preferably a circular path, which runs about the axis of rotation of the deflection element and which runs through at least one of the coupling devices. The preferred angles are thus to be measured between a first straight, which runs through the first coupling device and the axis of rotation, and a second straight, which runs through the second coupling device and the axis of rotation. Accordingly, the angle of inclination between the axis of the actuator unit and the axis of the actuating unit is preferably 20° to 120°, particularly preferably 75° to 105°. The mentioned angles ensure a reliable transmission of the braking force into the actuating element and allow for an advantageous mounting position of the actuator unit for a plurality of uses.

In order to provide a leverage or a gear ratio increase or a gear reduction between the actuator unit and the actuating unit it is preferred that the distances between the coupling devices and the axis of rotation of the deflection element are different. The different lever lengths, which are formed by the different distances from the axis of rotation, make it for example possible to easily realize an increase in braking force. Particularly preferably, the deflection element has different lever lengths and an angle between the lever arms, which is smaller 180°, preferably smaller 120°. In this way, in the case of a very compact design of the operating apparatus, great braking forces or great operation paths may be achieved.

The deflection element may be disc-shaped, for example. A particularly stable and weight-reduced deflection element may be achieved in that the deflection element has at least two essentially radially extending pivoted levers, on which the coupling devices are formed. The preferably V-shaped deflection element is mounted at its vertex at a preferably stationary axis of rotation.

In a preferred embodiment of the invention, at least one of the coupling devices is formed as a hinge connection. Preferably, a force transmission element is mechanically connected to the deflection element by means of a hinge, wherein a force is transmittable. The force transmission element may be in particular the actuator element or the actuating element or a part thereof.

In order to transmit the force from the actuator element to the rotating deflection element or from the rotating deflection element to the actuating element, the actuator element and/or the actuating element may have a linearly mobile base body and a transmission head pivotably mounted thereon. The transmission head may be coupled to the deflection element by means of a hinge connection. Alternatively, it may also be provided to mount the hinge radially mobile in order to ensure a balance between the rotational movement of the deflection element and the linear movement of the actuator element or of the actuating element.

Instead of a defined pivot point at least one of the coupling devices may have a sliding or rolling surface, along which a force transmission element, in particular in the radial direction is mobile, in particular slidable or rollable. In the context of the present invention, radial direction means preferably a parallel to a straight, which runs through one of the coupling devices and the axis of rotation. In this way, it is possible to do without a balancing force transmission head of the actuator element and/or of the actuating element.

A particularly sturdy and low-maintenance operating apparatus may be provided in that the actuating unit and the transmission unit are accommodated in a common housing. The housing encloses preferably the deflection element as well as preferably the actuating element, which preferably has a wedge. Preferably, the housing is in addition flanged directly to a housing of the actuator unit. This effectively prevents the entry of dirt into the deflection device. Particularly preferably, the common housing is formed one-piece. Preferably, the common housing is a once-piece casting, which may be manufactured particularly easily.

Preferably, a fastening device is provided, which makes it possible to attach the operating apparatus to an axle element of the wheel to be braked in different rotational positions about the longitudinal axis or actuating axle of the actuating element and/or a wheel axle of an axle element of a wheel to be braked. Due to this variable possibility of attachment, the actuator unit may be arranged flexibly in the space about the longitudinal axis of the actuating element and/or the wheel axle. The area of use of the actuating device is thus further enlarged. In particular, a housing of the operating apparatus may have a fastening or contact surface, which at least partially extends about the actuating axle. The fastening surface may be formed as a curved surface, for example, or comprise at least two partial surfaces, which are positioned at an angle relative to each other.

In a further preferred embodiment, the deflection device causes the force to be deflected in a plane, which is spanned by a wheel axle of an axle element of a wheel to be braked and a perpendicular to the wheel axle. The perpendicular to the wheel axle is preferably parallel to the vertical, wherein the axle element is preferably arranged essentially horizontally. Thus, the deflection is done in a plane, which contains the longitudinal axis of the axle element. Preferably, a longitudinal axis of the actuator unit or of the actuator element (actuator axle) is oriented such that it intersects the longitudinal axis of the axle element (wheel axle).

However, the invention makes it also possible that the deflection is done in a plane, which is intersected by the longitudinal axis of the axle element or which is arranged parallel to the longitudinal axis. A room-saving arrangement of the actuator unit may be achieved in particular in that the actuator unit has a longitudinal axis (actuator axle), which is inclined relative to the radius of the axle element of the wheel to be braked and/or in that the actuator axle and the wheel axle are skew relative to each other.

The invention offers in particular the following advantages:

1. Due to the force deflection a very compact, light-weight and cost-optimized brake device may be realized, which may in particular be formed as a spread brake or as a wedge brake.
2. The integrated deflection device does not require any additional interfaces, which might interfere with the tightness.
3. Due to the deflection device integrated into the housing of the actuating unit, the cylinder weight is absorbed by a common, rigid housing, which is firmly connected to the axle body.
4. It is possible to use standard components, which only need to be supplemented by the parts of the deflection.
5. It is possible to use the same brake cylinders as for a spreader unit or an actuating unit without deflection.
6. Due to the integrated deflection, no outer linkage is necessary, which might react sensitively to outer influences, thus reducing the reliability of the brake.
7. The wedge unit remains low-maintenance.
8. The wedge unit may be completely pre-mounted independent of the brake.
9. Several brake sizes may be covered, as is the case for wedge units without deflection.
10. A single-piece housing may be realized for the complete spreader unit including deflection.

The invention will be described in more detail hereinafter with the help of an exemplary embodiment, which is shown in the appended Figures.

DETAILED DESCRIPTION OF THE PREFERRED EMBODIMENTS

Figure 1:
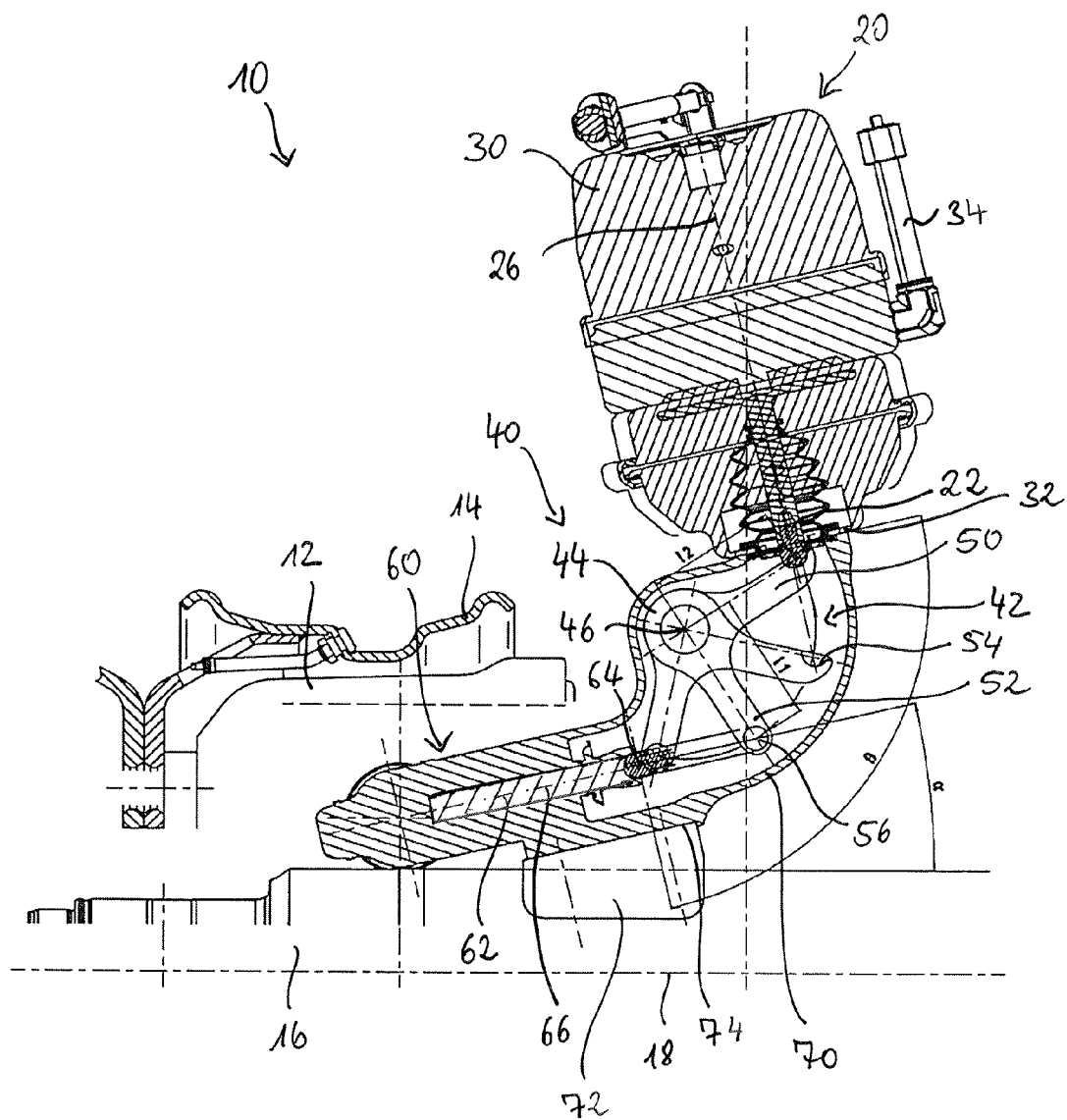
FIG. 1 shows a longitudinal section through an operating apparatus according to the invention of a drum brake.

Similar components or components having the same effect have the same reference signs in the Figures.

An exemplary embodiment of an operating apparatus 10 according to the invention, which is to be considered basically as a part of a brake, in particular a drum brake, will be described hereinafter with reference to FIGS. 1 and 2.

The operating apparatus 10 comprises an actuator unit 20, which is formed as a pneumatic brake cylinder and which has an actuator housing 30. In the actuator housing 30, an actuator element 22 is mounted longitudinally mobile along an actuator axle 26. In order to pneumatically drive the actuator element 22, a compressed air supply 34 is provided. The actuator element is mobile against a spring force, which moves the actuator element 22 against the compressed air into a return position.

An actuating unit 60, which may also be referred to as spreader unit, comprises an actuating element 62, which is linearly mobile along an actuating axle 66 and which has a wedge, which is not shown in the Figures. By linearly moving the wedge along the actuating axle 66, a brake element may be pushed radially against the inside of a brake drum 12 in order to carry out a braking operation. The brake drum 12 is firmly connected to a rim 14 of a wheel to be braked and rotates together with the latter about a particularly rigid or stationarily mounted axle element 16 with a wheel axle 18. The actuating axle 66 of the actuating element 62 runs at an angle to the wheel axle 18.

In order to transmit the braking force from the actuator element 22 to the actuating element 62, in the application path between the actuator unit 20 and the actuating unit 60, a transmission unit 40 with a force transmission element is arranged. The transmission unit 40 comprises a deflection device 42, by means of which the effective direction of the braking force is deflected from the actuator axle 26 into the actuating axle 66, which runs transverse or at an angle hereto.

The actuator element 22 pushes against a deflection element 44, which is rotatably mounted about an axis of rotation 46, causing a rotation of the deflection element 44 about the axis of rotation 46. The deflection element 44 pushes against the actuating element 62 of the actuating unit 60 and causes a linear displacement of the actuating element 62. A braking force is thus transmitted from the actuator element 22 to the actuating element 62.

The preferably V-shaped deflection element 44 comprises two pivoted levers 50, 52, which run at an angle relative to each other and which have respective coupling devices 54, 56, such as a coupling surface or a coupling joint. The actuator element 22 is connected to a first coupling device 54 of the deflection element 44, and the actuating element 62 is connected to a second coupling device 56 of the deflection element 44.

The first coupling device 54, which is formed at a first pivoted lever 50, has a contact surface, which is formed as a groove-shaped or tub-shaped cavity. The actuator element 22 comprises a pressure or head element 24, which is in particular mounted pivotably at one front face and which has an accordingly formed contact surface, which may be cylinder-shaped or spherical, for example. The head element 24 engages into the cavity of the deflection element 44 in order to transmit a compressive force.

A second coupling device 56 provided on a second pivoted lever 52 comprises a hinge, to which the actuating element 62 is coupled. In order to transmit the force to the linearly mobile actuating element 62, the actuating element 62 comprises a transmission head 64, which is movably mounted on a base body. Apart from transmitting compressive forces, the hinge makes it possible to also transmit tensile forces, for example in order to cause the actuating element 62 to return. The deflection element 44 may be pretensioned by means of a spring force, against which the braking force acts.

The deflection element 44 and the actuating element 62 are accommodated in a common housing 70. The actuator housing 30 of the actuator unit 20 is flanged directly to the housing 70 by means of a flange 32. In this way, the transmission mechanism for transmitting the braking force from the actuator unit 20 to the wedge unit or actuating unit 60 is well protected against outer influences.

The housing 70 is designed such that the actuator unit 20 may be arranged in different rotational positions about the wheel axle 18 and in different rotational positions about the actuating axle 66. To this end, a first fastening area 72 is provided for attaching the housing 70 to the axle element 16. The fastening area 72 is designed such that the housing 70 may be arranged in different rotational positions γ about the wheel axle 18 and be attached thereto. A second fastening area 74 allows for different rotational positions γ of the actuator unit 20 relative to the actuating axle 66.

Figure 2:
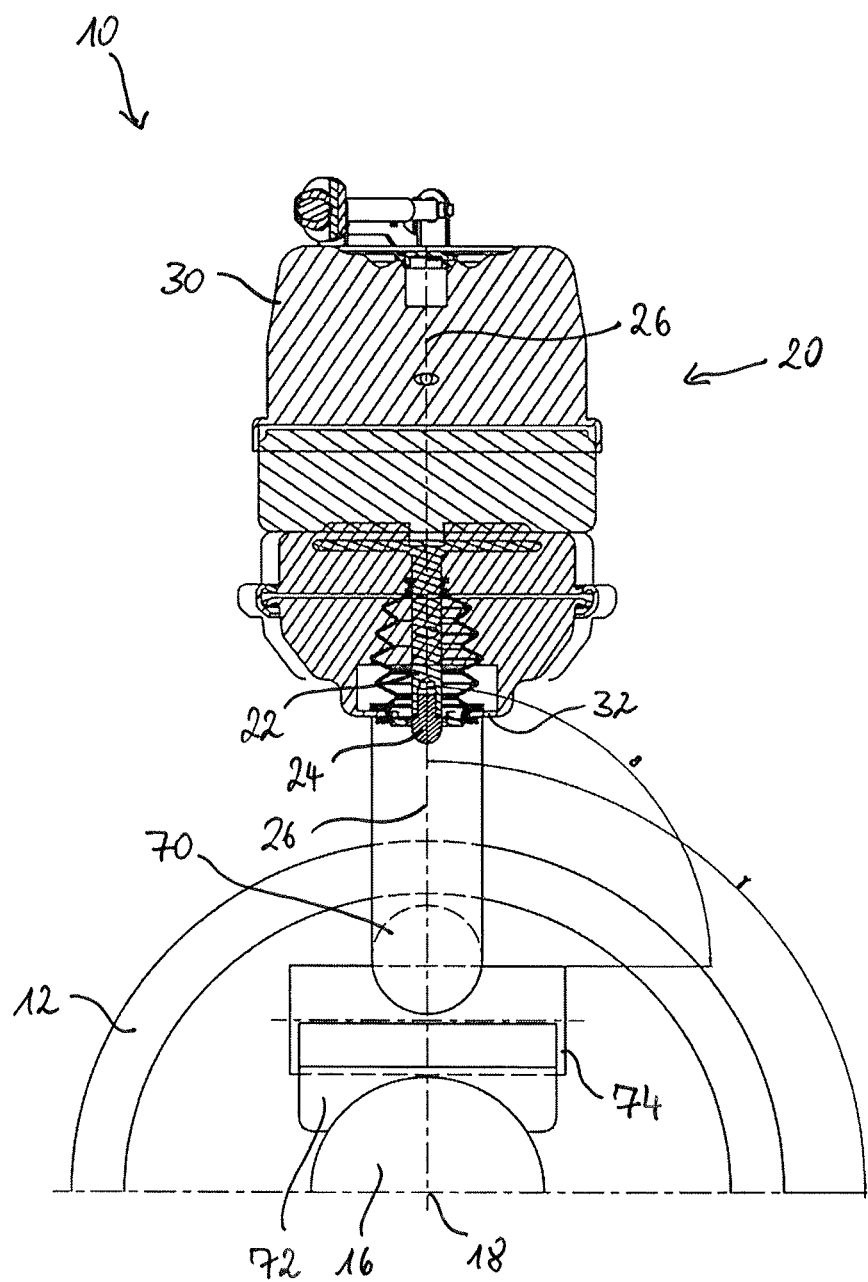
FIG. 2 shows a cross-section through an operating apparatus according to the invention of a drum brake.

Due to the deflection according to the invention constructive freedoms of design are provided, which by varying the below-mentioned parameters allow for almost any cylinder position:

α: axial inclination of the spreader unit or actuating unit, in particular of the actuating axle, relative to the wheel axle, preferably between +/−30°, more preferably between +/−15° (cf. FIG. 1);

β: inclination of the brake cylinder, in particular of the actuator axle relative to the spreader unit or actuating axle, in particular in the deflection plane, preferably between +45° and +135°, more preferably between +75° and +105° (cf. FIG. 1);

γ: rotational position of the operating apparatus or of the brake about the wheel axle, preferably between 0° and 360° (cf. FIG. 2); the operating apparatus may preferably be arranged in different rotational positions, preferably stageless, distributed along the wheel axle;

δ: rotational position of the operating apparatus or of the brake cylinder or of the actuator axle relative to the actuating unit or spreader unit, in particular about the actuating axle, preferably between −90° and +90°, more preferably between −15° and +90° (in particular relative to a plane, which contains the wheel axle and the actuating axle) (cf. FIG. 2);

$l_1$: lever length of the deflection lever or pivoted lever connected to the actuating or spreader unit, preferably between 20 mm and 100 mm, particularly preferably between 40 mm and 80 mm (cf. FIG. 1);

$l_2$: lever length of the deflection lever or pivoted lever connected to the brake cylinder, preferably between 15 mm and 200 mm, particularly preferably between 30 mm and 160 mm (cf. FIG. 1).

The relationship $l_2/l_1$ is preferably in a range of 0.5-2.5, more preferably between 0.75 and 2.0, and most preferably between 1 and 1.7.

Basically, it is also possible to use a separate deflection device, which is to be attached to an existing cylinder interface.

On the whole, the invention provides a particularly flexibly usable operating apparatus, which may also be used in assemblies, which are demanding when it comes to building space requirements.

LIST OF REFERENCE SIGNS 10 operating apparatus
12 brake drum
14 rim
16 axle element
18 wheel axle 20 actuator unit
22 actuator element
24 head element
26 actuator axle
30 actuator housing
32 flange
34 compressed air supply
40 transmission unit
42 deflection device
44 deflection element
46 axis of rotation
50 pivoted lever
52 pivoted lever
54 first coupling device
56 second coupling device
60 actuating unit
62 actuating element
64 transmission head
66 actuating axle
70 housing
72 fastening area
74 fastening area

The invention claimed is:

1. An operating apparatus for a brake comprising:
a first actuator unit with a linearly displaceable first actuator element;
a second actuating unit with a linearly displaceable second actuating element configured to move a braking element relative to at least one of a brake disc and a brake drum; and
a transmission unit configured to transmit a force from the first actuator element to the second actuating element;
wherein the transmission unit has a deflection device configured to deflect a force transmitted from the first actuator element to the second actuating element from a first direction into a second direction;
wherein the deflection device has a deflection element which is mounted rotatably about a stationary axis of rotation with at least two coupling devices which are displaced relative to each other in the direction of rotation for coupling respective force transmission elements; and
wherein distances between the coupling devices and the axis of rotation of the deflection element are different.

2. The operating apparatus of claim 1, wherein the coupling devices are displaced relative to each other at an angle of 20° to 120° in a circumferential direction.

3. The operating apparatus of claim 2, wherein the coupling devices are displaced relative to each other at an angle of 75° to 105° in the circumferential direction.

4. The operating apparatus of claim 2, wherein the rotatably mounted deflection element has at least two radially extending pivoted levers on which the coupling devices are formed.

5. The operating apparatus of claim 4, wherein the at least one of the coupling devices comprises as a hinge connection.

6. The operating apparatus of claim 5, wherein the at least one of the coupling devices has at least one of a sliding surface and a rolling surface, along which a force transmission element is movable in a radial direction.

7. The operating apparatus of claim 6, wherein the second actuating unit and the transmission unit are accommodated in a common housing.

8. The operating apparatus of claim 7 further comprising:
a fastening device that is configured to allow the operating apparatus to be fastened to at least one of an axle element in different rotational positions about a longitudinal axis of the second actuating element and a wheel axle of an axle element of a wheel to be braked.

9. The operating apparatus of claim 8, wherein the deflection device causes a deflection of the force in a plane, which is spanned by a wheel axle of an axle element of a wheel to be braked and a perpendicular to the wheel axle.

10. The operating apparatus of claim 9, further comprising:
a first coupling device onto which acts at least one of the first actuator element and a force transmission element connected thereto.

11. The operating apparatus of claim 10, wherein at least one of the first actuator element and the second actuating element has a linearly mobile base body and a transmission head pivotably mounted thereon.

12. The operating apparatus of claim 1, wherein the rotatably mounted deflection element has at least two radially extending pivoted levers on which the coupling devices are formed.

13. The operating apparatus of claim 1, wherein the at least one of the coupling devices comprises as a hinge connection.

14. The operating apparatus of claim 1, wherein the at least one of the coupling devices has at least one of a sliding surface and a rolling surface, along which a force transmission element is movable in a radial direction.

15. The operating apparatus of claim 1, wherein the second actuating unit and the transmission unit are accommodated in a common housing.

16. The operating apparatus of claim 1, wherein the deflection device causes a deflection of the force in a plane, which is spanned by a wheel axle of an axle element of a wheel to be braked and a perpendicular to the wheel axle.

17. The operating apparatus of claim 1, further comprising:
a first coupling device onto which acts at least one of the first actuator element and a force transmission element connected thereto.

18. An operating apparatus for a brake comprising:
a first actuator unit with a linearly displaceable first actuator element; a second actuating unit with a linearly displaceable second actuating element configured to move a braking element relative to at least one of a brake disc and a brake drum; and
a transmission unit configured to transmit a force from the first actuator element to the second actuating element;
wherein the transmission unit has a deflection device configured to deflect a force transmitted from the first actuator element to the second actuating element from a first direction into a second direction;
wherein the deflection device has a deflection element which is mounted rotatably about a stationary axis of rotation with at least two coupling devices which are displaced relative to each other in the direction of rotation for coupling respective force transmission elements;
a fastening device that is configured to allow the operating apparatus to be fastened to at least one of an axle element in different rotational positions about a longitudinal axis of the second actuating element and a wheel axle of an axle element of a wheel to be braked; and
wherein distances between the coupling devices and the axis of rotation of the deflection element are different.

19. An operating apparatus for a brake comprising:
a first actuator unit with a linearly displaceable first actuator element;

a second actuating unit with a linearly displaceable second actuating element configured to move a braking element relative to at least one of a brake disc and a brake drum; and a transmission unit configured to transmit a force from the first actuator element to the second actuating element;

wherein the transmission unit has a deflection device configured to deflect a force transmitted from the first actuator element to the second actuating element from a first direction into a second direction;

wherein the deflection device has a deflection element which is mounted rotatably about a stationary axis of rotation with at least two coupling devices which are displaced relative to each other in the direction of rotation for coupling respective force transmission elements;

wherein distances between the coupling devices and the axis of rotation of the deflection element are different; and wherein a ratio between a distance between the first coupling device and the axis of rotation and a distance between the second coupling device and the axis of rotation is greater than 1.

20. An operating apparatus for a brake comprising:

a first actuator unit with a linearly displaceable first actuator element;

a second actuating unit with a linearly displaceable second actuating element configured to move a braking element relative to at least one of a brake disc and a brake drum; and a transmission unit configured to transmit a force from the first actuator element to the second actuating element;

wherein the transmission unit has a deflection device configured to deflect a force transmitted from the first actuator element to the second actuating element from a first direction into a second direction;

wherein the deflection device has a deflection element which is mounted rotatably about a stationary axis of rotation with at least two coupling devices which are displaced relative to each other in the direction of rotation for coupling respective force transmission elements;

wherein distances between the coupling devices and the axis of rotation of the deflection element are different; and wherein a ratio between a distance between the first coupling device and the axis of rotation and a distance between the second coupling device and the axis of rotation is less than 1.

* * * * *